United States Patent
Kamiya et al.

(10) Patent No.: US 10,963,562 B2
(45) Date of Patent: Mar. 30, 2021

(54) MALICIOUS EVENT DETECTION DEVICE, MALICIOUS EVENT DETECTION METHOD, AND MALICIOUS EVENT DETECTION PROGRAM

(71) Applicant: NIPPON TELEGRAPH AND TELEPHONE CORPORATION, Chiyoda-ku (JP)

(72) Inventors: Kazunori Kamiya, Musashino (JP); Yang Zhong, Musashino (JP); Tohru Sato, Musashino (JP); Kensuke Nakata, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 133 days.

(21) Appl. No.: 16/304,753

(22) PCT Filed: Jun. 1, 2017

(86) PCT No.: PCT/JP2017/020517
§ 371 (c)(1),
(2) Date: Nov. 27, 2018

(87) PCT Pub. No.: WO2017/217247
PCT Pub. Date: Dec. 21, 2017

(65) Prior Publication Data
US 2020/0089877 A1 Mar. 19, 2020

(30) Foreign Application Priority Data
Jun. 16, 2016 (JP) .............................. JP2016-120011

(51) Int. Cl.
*G06F 21/55* (2013.01)
*H04L 29/06* (2006.01)
*H04L 29/08* (2006.01)

(52) U.S. Cl.
CPC .......... *G06F 21/554* (2013.01); *G06F 21/552* (2013.01); *H04L 63/145* (2013.01); *H04L 63/1425* (2013.01)

(58) Field of Classification Search
CPC ... G06F 21/554; G06F 21/552; H04L 63/145; H04L 63/1425
(Continued)

(56) References Cited

U.S. PATENT DOCUMENTS 9,197,628 B1 * 11/2015 Hastings ............. H04L 63/1416
10,320,813 B1 * 6/2019 Ahmed ............... H04L 63/1441
(Continued)

FOREIGN PATENT DOCUMENTS

JP  2004-312083 A  11/2004
JP  2007-96735 A   4/2007
(Continued)

OTHER PUBLICATIONS

"Separation of benign and malicious network events for accurate malware family classification"—Mekky et al, University of Minnesota, Sep. 30, 2015 https://ieeexplore.ieee.org/document/7346820 (Year: 2015).*
(Continued)

*Primary Examiner* — Randy A Scott
(74) *Attorney, Agent, or Firm* — Oblon, McClelland, Maier & Neustadt, L.L.P.

(57) ABSTRACT

A playback device reads a traffic file which is a dump file of traffic when malicious or benign traffic is generated and generates traffic based on the traffic file on a network having a security instrument that generates an event in accordance with the traffic. In addition, a determination device collects an event generated by the security instrument for the generated traffic and, on the basis of a feature extracted from the
(Continued)

collected event, determines whether the event to be determined is for malicious traffic or benign traffic.

7 Claims, 19 Drawing Sheets

(58) Field of Classification Search
USPC ................................. 726/5, 22, 23, 24, 25
See application file for complete search history.

(56) References Cited

U.S. PATENT DOCUMENTS

| 2007/0074272 | A1 | 3/2007 | Watanabe | |
|---|---|---|---|---|
| 2010/0050262 | A1* | 2/2010 | Knapp | H04L 69/22 726/25 |
| 2012/0079596 | A1* | 3/2012 | Thomas | G06F 21/566 726/24 |
| 2015/0135262 | A1* | 5/2015 | Porat | G06F 21/554 726/1 |

FOREIGN PATENT DOCUMENTS

| JP | 2010-15513 A | 1/2010 |
|---|---|---|
| JP | 2011-76188 A | 4/2011 |
| JP | 2014-175699 A | 9/2014 |

OTHER PUBLICATIONS

Notice of Allowance dated Sep. 17, 2019 in Japanese Patent Application No. 2018-523650 (with unedited computer generated English translation), 3 pages.

Moriyama, E., et al., "A Study on Real Time Analysis of Internet Events", Information and Communication Engineers 2006 Synthesis convention lecture collected papers, Information and Communication Engineers, Mar. 8, 2006, BS-5-14, pp. S-61-S-62 (with English translation).

International Search Report dated Aug. 29, 2017 in PCT/JP2017/020517 filed Jun. 1, 2017.

Shenk, J., "SANS Eighth Annual 2012 Log and Event Management Survey Results: Sorting Through the Noise," SANS Institute InfoSec Reading Room, May 2012, 17 pages.

* cited by examiner

FIG.3

| SOURCE IP ADDRESS (SOURCE MALWARE IDENTIFIER) | PROTOCOL | SOURCE PORT NUMBER | DESTINATION IP ADDRESS (DESTINATION MALWARE IDENTIFIER) | DESTINATION PORT NUMBER | NUMBER OF TRANSMISSION BYTES |
|---|---|---|---|---|---|
| M1 | UDP | 53 | 192.0.2.8 | 1037 | 20 |
| 192.0.2.8 | UDP | 53 | M1 | 1038 | 25 |
| M1 | UDP | 53 | 192.0.2.8 | 1039 | 20 |
| M1 | TCP | 80 | 198.51.100.70 | 1035 | 128 |
| 198.51.100.70 | TCP | 1035 | M1 | 80 | 1500 |
| M2 | UDP | 16471 | 203.0.113.41 | 1056 | 16 |
| M2 | UDP | 16471 | 203.0.113.42 | 1057 | 16 |
| M2 | UDP | 16471 | 203.0.113.3 | 1058 | 16 |

FIG.4

| PACKET IDENTIFIER | MALWARE IDENTIFICATION IP ADDRESS/ SOURCE IP ADDRESS | PROTOCOL | SOURCE PORT NUMBER | MALWARE IDENTIFICATION IP ADDRESS/ DESTINATION IP ADDRESS | DESTINATION PORT NUMBER | NUMBER OF TRANSMISSION BYTES | TRANSMISSION NIC | TRIGGER PACKET IDENTIFIER | START PACKET IDENTIFIER |
|---|---|---|---|---|---|---|---|---|---|
| P1 | 192.168.1.1 | UDP | | 192.0.2.8 | 1037 | 20 | NIC1 | None | P1 |
| P2 | 192.0.2.8 | UDP | 53 | 192.168.1.1 | 1038 | 25 | NIC2 | P1 | P1 |
| P3 | 192.168.1.1 | UDP | | 192.0.2.8 | 1039 | 20 | NIC1 | P2 | P3 |
| P4 | 192.168.1.1 | TCP | | 198.51.100.70 | 1035 | 128 | NIC1 | P3 | P4 |
| P5 | 198.51.100.70 | TCP | 1035 | 192.168.1.1 | 80 | 1500 | NIC2 | P4 | P4 |
| P6 | 192.168.1.2 | UDP | 16471 | 203.0.113.41 | 1056 | 16 | NIC1 | P5 | P6 |
| P7 | 192.168.1.2 | UDP | 16471 | 203.0.113.42 | 1057 | 16 | NIC1 | P6 | P7 |
| P8 | 192.168.1.2 | UDP | 16471 | 203.0.113.3 | 1058 | 16 | NIC1 | P7 | P8 |

FIG.9

| SEQUENTIAL NUMBER | ITEM |
|---|---|
| 1 | SENSING TIME |
| 2 | SECURITY INSTRUMENT NAME |
| 3 | CATEGORY OF THREAT (CATEGORY ID) |
| 4 | DEGREE OF URGENCY |
| 5 | SENSED EVENT NAME (EVENT ID) |
| 6 | SOURCE IP ADDRESS |
| 7 | DESTINATION IP ADDRESS |
| 8 | SOURCE PORT NUMBER |
| 9 | DESTINATION PORT NUMBER |
| 10 | APPLICATION |
| 11 | ACTION |
| ... | ... |

FIG.10

| SENSING TIME | SECURITY INSTRUMENT NAME | CATEGORY | DEGREE OF URGENCY | EVENT NAME | SOURCE/ DESTINATION IP ADDRESS/ MALWARE IDENTIFIER | | SOURCE PORT NUMBER | DESTI- NATION PORT NUMBER | APPLICATION | ACTION |
|---|---|---|---|---|---|---|---|---|---|---|
| 03/11 00:00:01 | COMPANY A PRODUCT | SPYWARE | Medium | Generic User-Agent | M1 | 10.0.0.1 | 1024 | 80 | Web-browsing | alert |
| 03/11 00:00:02 | COMPANY A PRODUCT | VULNERA- BILITY | Low | DGA NXDoma | 10.1.0.1 | M1 | 53 | 1000 | Dns | alert |
| 03/11 00:00:03 | COMPANY A PRODUCT | ILLEGAL SITE | Info | http://malicious.com/ | M1 | 10.0.0.2 | 1025 | 80 | Web-browsing | alert |
| 03/11 00:00:04 | COMPANY A PRODUCT | ADWARE | Info | http://adware.com/ | M1 | 10.0.0.3 | 1026 | 80 | Web-browsing | alert |
| 03/11 01:00:01 | COMPANY A PRODUCT | UNKNOWN SITE | Info | http://unknown.com/ | M1 | 10.0.0.4 | 1027 | 80 | Web-browsing | alert |
| 03/11 01:00:02 | COMPANY B PRODUCT | MALWARE | Medium | Win32.trojan | M1 | 10.0.0.4 | 1027 | 80 | Web-browsing | alert |
| 03/11 01:00:03 | COMPANY C PRODUCT | SPYWARE | Critical | Command & Control | M1 | 10.0.0.4 | 1027 | 80 | Web-browsing | alert |
| 03/11 01:00:04 | COMPANY D PRODUCT | VULNERA- BILITY | Critical | Buffer Overflow | M1 | 10.0.0.4 | 1027 | 80 | Web-browsing | alert |

FIG.11

| SENSING TIME | SECURITY INSTRU- MENT NAME | CATEGORY | DEGREE OF URGENCY | EVENT NAME | SOURCE/ DESTINATION IP ADDRESS | | SOURCE PORT NUMBER | DESTI- NATION PORT NUMBER | APPLICATION | ACTION |
|---|---|---|---|---|---|---|---|---|---|---|
| 03/11 00:00:01 | COMPANY A PRODUCT | VULNERA- BILITY | Info | HTTP Non RFC- Compliant | 192.168.1.1 | 10.0.0.1 | 1024 | 80 | Unknown-tcp | alert |
| 03/11 00:00:02 | COMPANY A PRODUCT | VULNERA- BILITY | Info | Insecure SSL v3.0 | 192.168.1.1 | 10.0.0.2 | 1025 | 80 | Web-browsing | alert |
| 03/11 00:00:03 | COMPANY A PRODUCT | VULNERA- BILITY | Info | POODLE Bites | 192.168.1.1 | 10.0.0.3 | 1026 | 80 | Web-browsing | alert |
| 03/11 01:00:01 | COMPANY A PRODUCT | VULNERA- BILITY | Info | HTTP OPTIONS Method | 192.168.1.1 | 10.0.0.4 | 1027 | 80 | Web-browsing | alert |
| 03/11 01:00:02 | COMPANY B PRODUCT | VULNERA- BILITY | Low | POODLE Bites | 192.168.1.1 | 10.0.0.4 | 1027 | 80 | Web-browsing | alert |

FIG.12

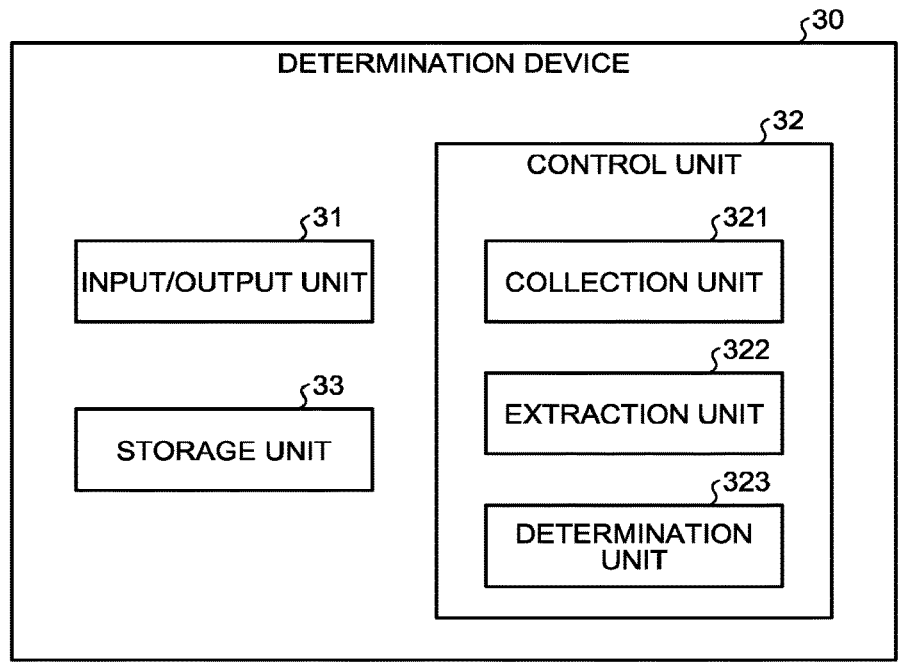

FIG.13

| FEATURE | NUMBER OF PIECES OF MALWARE | GENERATION RATE |
|---|---|---|
| COMPANY A PRODUCT_EVENT Ea1 | 80 | 0.8 |
| COMPANY A PRODUCT_EVENT Ea2 | 10 | 0.1 |
| COMPANY A PRODUCT_APPLICATION Aa1 | 10 | 0.1 |
| COMPANY A PRODUCT_APPLICATION Aa2 | 10 | 0.1 |
| COMPANY B PRODUCT_EVENT Eb1 | 80 | 0.8 |
| COMPANY B PRODUCT_EVENT Eb2 | 10 | 0.1 |
| COMPANY B PRODUCT_APPLICATION Ab1 | 10 | 0.1 |
| COMPANY B PRODUCT_APPLICATION Ab2 | 10 | 0.1 |
| COMPANY A PRODUCT_EVENT Ea3 COMPANY A PRODUCT_EVENT Ea4 | 60 | 0.6 |
| COMPANY A PRODUCT_EVENT Ea5 COMPANY B PRODUCT_EVENT Eb5 | 60 | 0.6 |

FIG.14

| FEATURE | MALICIOUS EVENT | | BENIGN EVENT | | | MALICIOUS SCORE | |
|---|---|---|---|---|---|---|---|
| | NUMBER OF PIECES OF MALWARE | GENERATION RATE | NUMBER OF BENIGN TERMINALS | GENERATION RATE | RATIO OF GENERATION RATES | | X-SQUARE VALUE |
| COMPANY A PRODUCT_EVENT Ea1 | 80 | 0.8 | 80 | 0.8 | 1 | | ⋮ |
| COMPANY A PRODUCT_EVENT Ea2 | 10 | 0.1 | 10 | 0.1 | 1 | | ⋮ |
| COMPANY A PRODUCT_APPLICATION Aa1 | 10 | 0.1 | 10 | 0.1 | 1 | | ⋮ |
| COMPANY A PRODUCT_APPLICATION Aa2 | 10 | 0.1 | 10 | 0.1 | 1 | | ⋮ |
| COMPANY B PRODUCT_EVENT Eb1 | 80 | 0.8 | 1 | 0.01 | 80 | | ⋮ |
| COMPANY B PRODUCT_EVENT Eb2 | 10 | 0.1 | 10 | 0.1 | 1 | | ⋮ |
| COMPANY B PRODUCT_APPLICATION Ab1 | 10 | 0.1 | 10 | 0.1 | 1 | | ⋮ |
| COMPANY B PRODUCT_APPLICATION Ab2 | 10 | 0.1 | 10 | 0.1 | 1 | | ⋮ |
| COMPANY A PRODUCT_EVENT Ea3 COMPANY A PRODUCT_EVENT Ea4 | 60 | 0.6 | 1 | 0.01 | 90 | | ⋮ |
| COMPANY A PRODUCT_EVENT Ea5 COMPANY B PRODUCT_EVENT Eb5 | 60 | 0.6 | 1 | 0.01 | 120 | | ⋮ |

FIG.15

| FEATURE | MALICIOUS SCORE | |
| --- | --- | --- |
| | RATIO OF GENERATION RATES | X-SQUARE VALUE |
| COMPANY B PRODUCT_EVENT Eb1 | 80 | ... |
| COMPANY A PRODUCT_EVENT Ea3<br>COMPANY A PRODUCT_EVENT Ea4 | 90 | ... |
| COMPANY A PRODUCT_EVENT Ea5<br>COMPANY B PRODUCT_EVENT Eb5 | 120 | ... |

MALICIOUS EVENT DETECTION DEVICE, MALICIOUS EVENT DETECTION METHOD, AND MALICIOUS EVENT DETECTION PROGRAM

FIELD

The present invention relates to a malicious event detection device, a malicious event detection method, and a malicious event detection program.

BACKGROUND

With the proliferation of the Internet, cyberattacks such as distributed denial of service (DDoS) attacks and spam mail transmission are routinely made. Most of these attacks are caused by malignant software called malware. Attackers cause terminals or servers of ordinary users to be infected with malware and operate the malware to illegally control the terminals and the servers with the intention of launching attacks. These attacks have become an issue of public concern recently. For this reason, measures against the cyberattack, mainly against the malware infection, are urgently required.

Measures against cyberattacks include a technique of taking measures using anti-virus software or the like as entry measures to prevent infection, but it is difficult to completely prevent infection. Therefore, the importance of exit measures to prevent the spread of damage after malware infection is rising. In exit measures, it is important to find traces of attacks and discover malware-infected terminals. In response to discovering an infected terminal by exit measures, actions such as disconnection of the infected terminal from the network, filtering, and the like can be taken.

As a means for discovering malware-infected terminals, a technique of examining logs of devices present on the network has become an effective means (for example, refer to Patent Literature 1 and Non Patent Literature 1). In particular, since an event sensing log by a security instrument such as an intrusion detection system (IDS), next generation firewall, sandbox, and the like is based on know-how of experts with specialty in security, the event sensing log is regarded as an important source of information to discover malware-infected terminals.

CITATION LIST

Patent Literature

Patent Literature 1: JP 2010-15513 A

Non Patent Literature

Non Patent Literature 1: SANS Eighth Annual 2012 Log and Event Management Survey Results: Sorting Through the Noise

SUMMARY

Technical Problem

However, a large number of different types of events are sensed by security instruments, including those not correlated with communication by malware. For this reason, the conventional technique has a problem that it is difficult to efficiently analyze events sensed by security instruments.

For example, when a large number of different types of events are directly presented to an operator, manual analysis by the operator is required, such that the time necessary to specify a malware-infected terminal and the cost of operation increase. In such a case, it is difficult to efficiently analyze events sensed by security instruments.

In addition, for example, in a technique of reducing events to be analyzed by registering unaffected events in a whitelist and extracting events other than those in the whitelist, when new threats appear one after another and the type of the event increases, the number of events does not decrease. For this reason, it is difficult to efficiently analyze events sensed by security instruments with the technique using the whitelist.

Furthermore, in a technique of extracting and analyzing only events whose degree of urgency, which has been given to each event, is equal to or greater than a predetermined level, there are cases where, among events that characterize infection of malware, an event whose given degree of urgency is not equal to or greater than a predetermined level is inadvertently overlooked. For this reason, it is difficult to efficiently analyze events sensed by security instruments with the technique of extracting and analyzing only the events with the degree of urgency equal to or greater than a predetermined level.

Solution to Problem

To solve a problem and to achieve an object, a malicious event detection device includes: a reading unit that reads a traffic file which is a dump file of traffic when malicious or benign traffic is generated; a generation unit that generates traffic based on the traffic file on a network having a security instrument that generates an event in accordance with the traffic; a collection unit that collects an event generated by the security instrument for the generated traffic; an extraction unit that extracts a feature from the event collected by the collection unit; and a determination unit that determines whether the event to be determined is for malicious traffic or benign traffic, on the basis of the feature extracted by the extraction unit.

A malicious event detection method executed in a malicious event detection system, the malicious event detection method includes: a reading phase of reading a traffic file which is a dump file of traffic when malicious or benign traffic is generated; a generation phase of generating traffic based on the traffic file on a network having a security instrument that generates an event in accordance with the traffic; a collection phase of collecting an event generated by the security instrument for the generated traffic; an extraction phase of extracting a feature from the event collected by the collection phase; and a determination phase of determining whether the event to be determined is for malicious traffic or benign traffic, on the basis of the feature extracted by the extraction phase.

A malicious event detection program that causes a computer to execute: a reading step of reading a traffic file which is a dump file of traffic when malicious or benign traffic is generated; a generation step of generating traffic based on the traffic file on a network having a security instrument that generates an event in accordance with the traffic; a collection step of collecting an event generated by the security instrument for the generated traffic; an extraction step of extracting a feature from the event collected by the collection step; and a determination step of determining whether the event to be determined is for malicious traffic or benign traffic, on the basis of the feature extracted by the extraction step.

Advantageous Effects of Invention

According to the present invention, it is possible to efficiently analyze events sensed by security instruments.

BRIEF DESCRIPTION OF DRAWINGS

FIG. 3 is a diagram illustrating an example of a malicious traffic file.

FIG. 4 is a diagram illustrating examples of playback traffic.

FIG. 9 is a diagram illustrating an example of items of an event by a security instrument.

FIG. 10 is a diagram illustrating an example of events by a security instrument for malicious traffic.

FIG. 11 is a diagram illustrating an example of events by a security instrument for benign traffic.

FIG. 12 is a diagram illustrating an example of the configuration of a determination device according to the first embodiment.

FIG. 13 is a diagram illustrating an example of features extracted from malicious events.

FIG. 14 is a diagram illustrating an example of malicious scores.

FIG. 15 is a diagram illustrating an example of malicious event signatures.

DESCRIPTION OF EMBODIMENTS

Embodiments of a malicious event detection device, a malicious event detection method, and a malicious event detection program according to the present application will be described in detail below with reference to the drawings. The embodiments are not construed to restrict the present invention.

Configuration of First Embodiment

Figure 1:
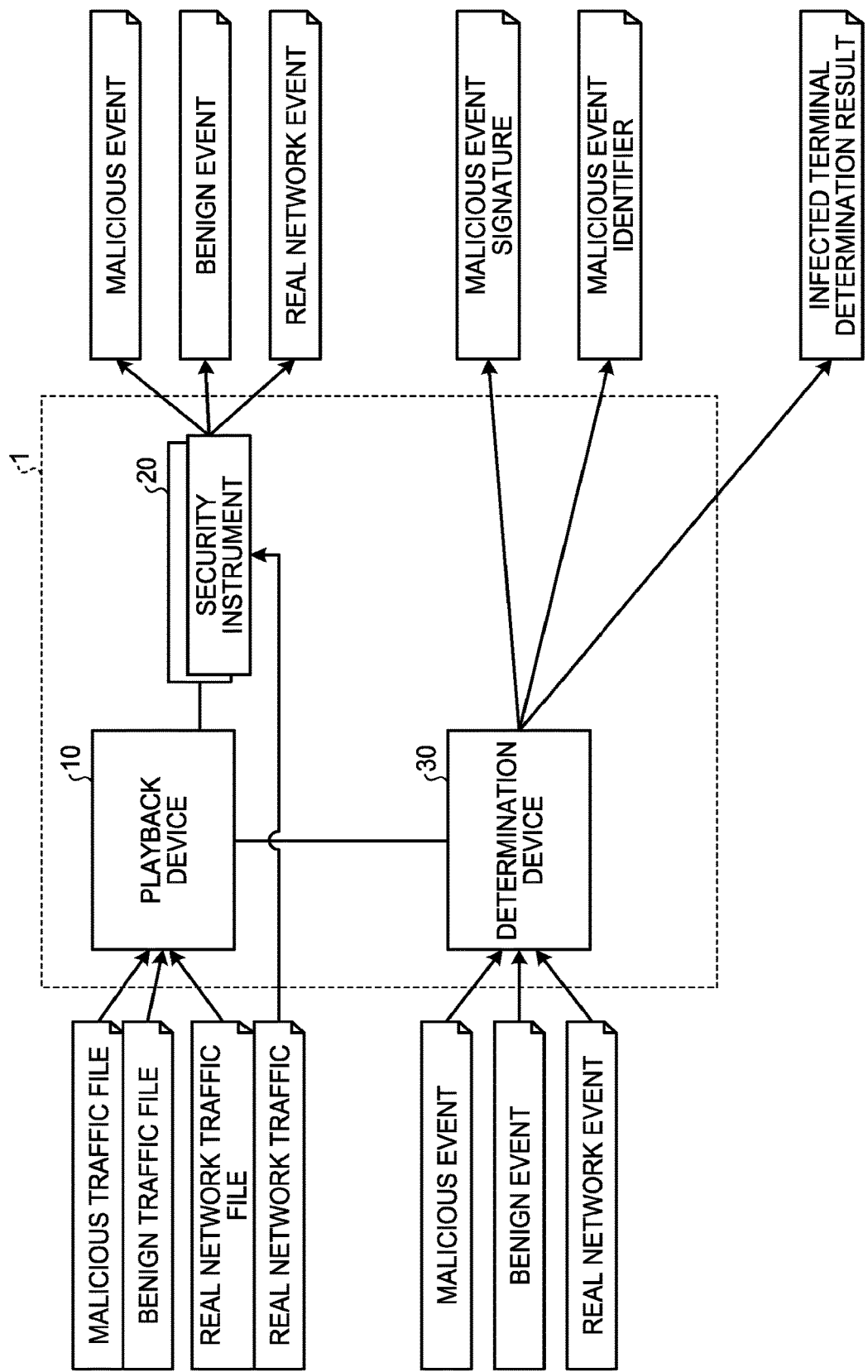
FIG. 1 is a diagram illustrating an example of the configuration of a malicious event detection system according to a first embodiment.

First, the configuration of a malicious event detection system according to a first embodiment will be described with reference to FIG. 1. FIG. 1 is a diagram illustrating an example of the configuration of the malicious event detection system according to the first embodiment. As illustrated in FIG. 1, a malicious event detection system 1 has a playback device 10, a security instrument 20, and a determination device 30.

In addition, the playback device 10, the security instrument 20, and the determination device 30 are connected by any type of communication network such as a wired or wireless local area network (LAN) or virtual private network (VPN). Note that a plurality of security instruments 20 may be included in the malicious event detection system 1 and the respective security instruments 20 may have different configurations.

The playback device 10 accepts inputs of a malicious traffic file, a benign traffic file, a real network traffic file, and the like. Note that the malicious traffic file is a dump file of traffic when malicious traffic is generated. Meanwhile, the benign traffic file is a dump file of traffic when benign traffic is generated. In addition, the real network traffic file is a dump file of traffic when traffic undetermined about whether it is malicious or benign is generated.

The malicious traffic file is acquired by, for example, activating malware in a pseudo environment and performing dynamic analysis. In addition, the benign traffic file is acquired from, for example, traffic information on a terminal which is clearly not infected with malware. The real network traffic file is acquired from traffic information on a network actually being used and is a target to be determined about whether it is malicious or benign.

Furthermore, the playback device 10 generates traffic on the basis of the malicious traffic file, the benign traffic file, the real network traffic file, and the like. Note that, in the following description, generating traffic based on the traffic files is sometimes referred to as playing back traffic.

The security instrument 20 generates an event in accordance with the generated traffic. For example, the security instrument 20 generates a malicious event as an event in accordance with malicious traffic, generates a benign event as an event in accordance with benign traffic, and generates a real network event as an event in accordance with real network traffic. Note that the security instrument 20 may generate the real network event from the real network traffic of the network, instead of generating from the traffic generated by the playback device 10.

For example, the determination device 30 determines whether the real network event is malicious or benign using a malicious event signature or malicious event identifier created on the basis of the malicious event and the benign event and outputs the determination result as an infected terminal determination result.

Figure 2:
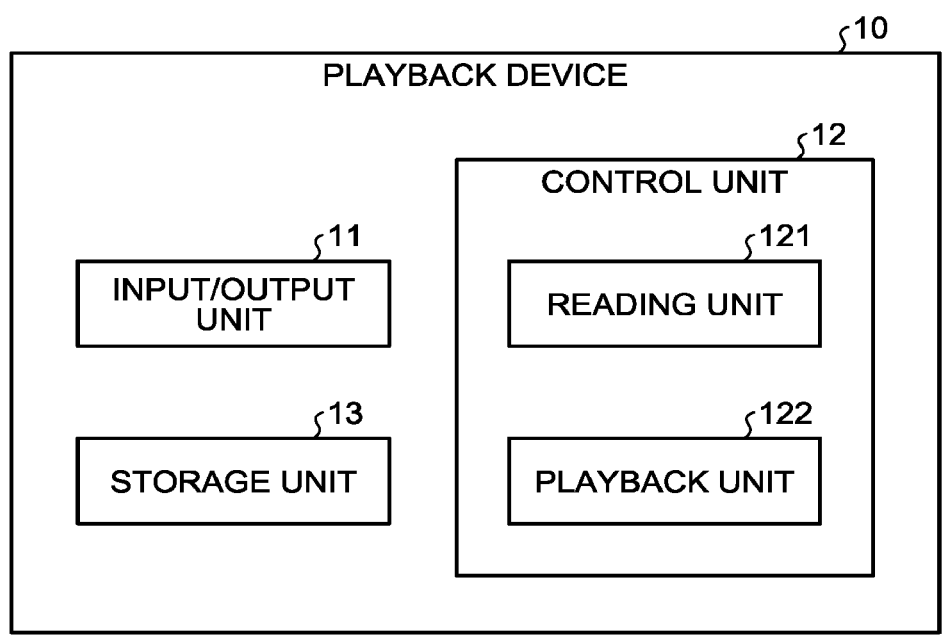
FIG. 2 is a diagram illustrating an example of the configuration of a playback device according to the first embodiment.

The configuration of the playback device 10 will be described with reference to FIG. 2. FIG. 2 is a diagram illustrating an example of the configuration of the playback device according to the first embodiment. As illustrated in FIG. 2, the playback device 10 has an input/output unit 11, a control unit 12, and a storage unit 13.

The input/output unit 11 inputs and outputs data. The input/output unit 11 performs data communication with another device, for example, via a network. For example, the input/output unit 11 is a network interface card (NIC).

The control unit 12 controls the entire playback device 10. The control unit 12 is, for example, hardware processing circuitry such as an electronic circuit such as a central processing unit (CPU) or a micro processing unit (MPU), or an integrated circuit such as an application specific integrated circuit (ASIC) or a field programmable gate array (FPGA). The control unit 12 also has an internal memory for retaining programs defining various processing procedures and control data and executes each process using the internal memory. In addition, the control unit 12 functions as various processing units in response to various programs being activated. For example, the control unit 12 has a reading unit 121 and a playback unit 122. Note that the playback unit 122 is an example of a generation unit.

In addition, the storage unit 13 is a storage device such as a hard disk drive (HDD), a solid state drive (SSD), or an optical disc. Note that the storage unit 13 may be a semiconductor memory capable of rewriting data, such as a random access memory (RAM), a flash memory, or a non-volatile static random access memory (NVSRAM). The storage unit 13 stores an operating system (OS) and various programs executed by the playback device 10. Furthermore, the storage unit 13 stores various items of information used for execution of the programs.

Here, processes in the reading unit 121 and the playback unit 122 of the control unit 12 will be described. The reading unit 121 reads the malicious traffic file and the benign traffic file. The reading unit 121 also gives information associated with traffic direction, order, and the like to the read traffic file and creates playback traffic. Note that the file read by the reading unit 121 is, for example, a file in a pcap format. In addition, the traffic according to the present embodiment is assumed as transmission and reception of packets.

The malicious traffic file read by the reading unit 121 will be described with reference to FIG. 3. FIG. 3 is a diagram illustrating an example of the malicious traffic file. As illustrated in FIG. 3, the items of the malicious traffic file include a source IP address (source malware identifier), a protocol, a source port number, a destination IP address (destination malware identifier), a destination port number, and the number of transmission bytes. Note that the items of the malicious traffic file illustrated in FIG. 3 are an example.

The item "source IP address (source malware identifier)" and the item "destination IP address (destination malware identifier)" are regions for storing an identifier uniquely identifying source or destination malware of the traffic or a source or destination IP address of the traffic. Note that each malware identifier is given when malware is activated in a pseudo environment and dumped (dynamically analyzed) by a security instrument.

The source malware identifier and the destination malware identifier may employ a Sha1Hash value of a malware specimen. Alternatively, the source malware identifier and the destination malware identifier may employ an IP address of a terminal having a malware specimen.

For example, the first line of FIG. 3 indicates malicious traffic of which the source malware identifier is "M1", the protocol is "UDP", the source port number is "53", the destination IP address is "192.0.2.8", the destination port number is "1037", and the number of transmission bytes is "20".

In addition, for example, the second line of FIG. 3 indicates malicious traffic of which the source IP address is "192.0.2.8", the protocol is "UDP", the source port number is "53", the destination malware identifier is "M1", the destination port number is "1038", and the number of transmission bytes is "25".

Note that the benign traffic file and the real network traffic file also have items similar to those of the malicious traffic file. However, items corresponding to the item "source IP address (source malware identifier)" and the item "destination IP address (destination malware identifier)" in the benign traffic file and the real network traffic file serve as items in which the source or destination IP address of the traffic is stored.

In addition, in the case of bidirectional communication, since return communication in which the destination and the source are exchanged is performed for the above communication, the malware identifier and the source and destination IP addresses of the benign traffic and the real network traffic can serve as both of the source and the destination.

The playback traffic created by the reading unit 121 will be described with reference to FIG. 4. FIG. 4 is a diagram illustrating examples of the playback traffic. The reading unit 121 extends the malicious traffic file, the benign traffic file, and the real network traffic file to a format that can be played back by the playback unit 122. Not that the items of the playback traffic illustrated in FIG. 4 are an example.

The reading unit 121 gives an item "packet identifier" to each flow of the traffic based on the malicious traffic file. In the item "packet identifier", an identifier for identifying each flow of traffic, which is a packet, is stored.

The reading unit 121 also converts the item "source IP address (source malware identifier)" and the item "destination IP address (destination malware identifier)" of the traffic based on the malicious traffic file into an item "malware identification IP address/source IP address" and an item "malware identification IP address/destination IP address", respectively. At this time, the reading unit 121 converts the source malware identifier and the destination malware identifier in the malicious traffic file into a malware identification IP address.

In addition, the reading unit 121 gives an item "transmission NIC" to each flow of the traffic based on the malicious traffic file. Then, the reading unit 121 stores a result of determining the directional orientation of the traffic in the item "transmission NIC". In the example in FIG. 4, the reading unit 121 assigns the transmission NIC as "NIC1" in the case of traffic whose source is malware and assigns the transmission NIC as "NIC2" in the case of traffic whose destination is malware.

The reading unit 121 also gives an item "trigger packet identifier" to each flow of the traffic based on the malicious traffic file and assigns traffic having an immediately preceding generation order as a trigger to set in the item "trigger packet identifier". At this time, after the generation of the traffic set as a trigger by the reading unit 121 is completed, the playback unit 122 generates traffic for which the generated traffic is set as a trigger.

Note that, in the example in FIG. 4, it is assumed that the arrangement order of traffic in the malicious traffic file corresponds to the traffic generation order. In addition, a serial number corresponding to the traffic generation order may be given to the malicious traffic file, or a generation time that can specify the generation order may be given thereto. Furthermore, the method by which the playback unit 122 generates traffic in line with the generation order is not limited to the method of setting the trigger, but may be, for example, a method of previously giving a serial number to the playback traffic.

The reading unit 121 also gives an item "start packet identifier" to each flow of the traffic based on the malicious traffic file and stores a packet identifier of a start packet which is an origin of the transmission of the packet in the item "start packet identifier". In other words, for the packets of the same session, the packet identifier of a first packet of the session is stored as the start packet identifier.

For example, when name resolution by the domain name system (DNS) is performed with the user datagram protocol (UDP), for inquiry and response packets that are in the same session, the packet identifier of the inquiry packet is stored as the start packet identifier. For example, it is conceivable that a packet whose packet identifier is "P1" in FIG. 4 is an inquiry packet. In this case, it is conceivable that a packet whose packet identifier is "P2" is a response packet. In addition, for example, when a connection is set with the transmission control protocol (TCP), for packets of SYN, SYN+ACK, and ACK which are in the same session, the packet identifier of the SYN packet is stored as the start packet identifier.

Note that, when a packet is blocked by the security instrument 20 or when a timeout occurs without receiving a trigger packet for a predetermined time, a packet having the same start packet identifier as that of the relevant packet that could not receive the trigger packet is not transmitted but the transmission is initiated from a packet with the next start packet identifier.

The first line of FIG. 4 indicates playback traffic of which the packet identifier is "P1", the malware identification IP address or the source IP address is "192.168.1.1", the protocol is "UDP", the source port number is "53", the malware identification IP address or the destination IP address is "192.0.2.8", the destination port number is "1037", the number of transmission bytes is "20", the transmission NIC is "NIC1", the trigger packet identifier is "None", and the start packet identifier is "P1". Note that, since the first line of FIG. 4 corresponds to the first line of FIG. 3, the traffic in the first line of FIG. 4 is traffic whose source is malware. In addition, since there is no traffic before the packet identifier P1, the trigger packet identifier is "None".

The second line of FIG. 4 indicates playback traffic of which the packet identifier is "P2", the malware identification IP address or the source IP address is "192.0.2.8", the protocol is "UDP", the source port number is "53", the malware identification IP address or the destination IP address is "192.168.1.1", the destination port number is "1038", the number of transmission bytes is "25", the transmission NIC is "NIC2", the trigger packet identifier is "P1", and the start packet identifier is "P1".

The playback unit 122 generates the traffic based on the traffic files on a network having the security instrument 20. Note that the security instrument 20 generates an event in accordance with traffic. In addition, the playback unit 122 generates traffic in line with playback traffic created by the reading unit 121.

Figure 5:
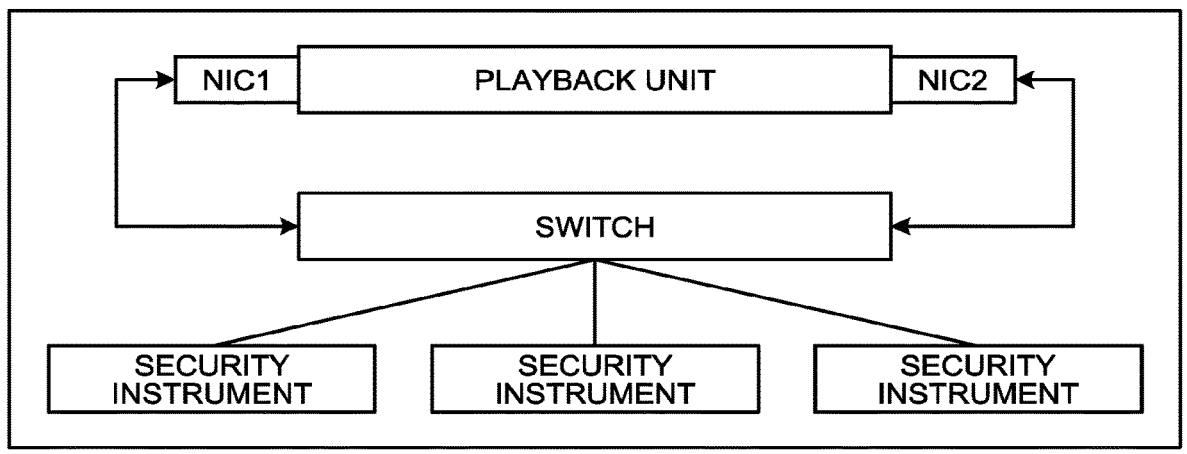
FIG. 5 is a diagram illustrating an example of a connection method for a playback device and security instruments.
Figure 6:
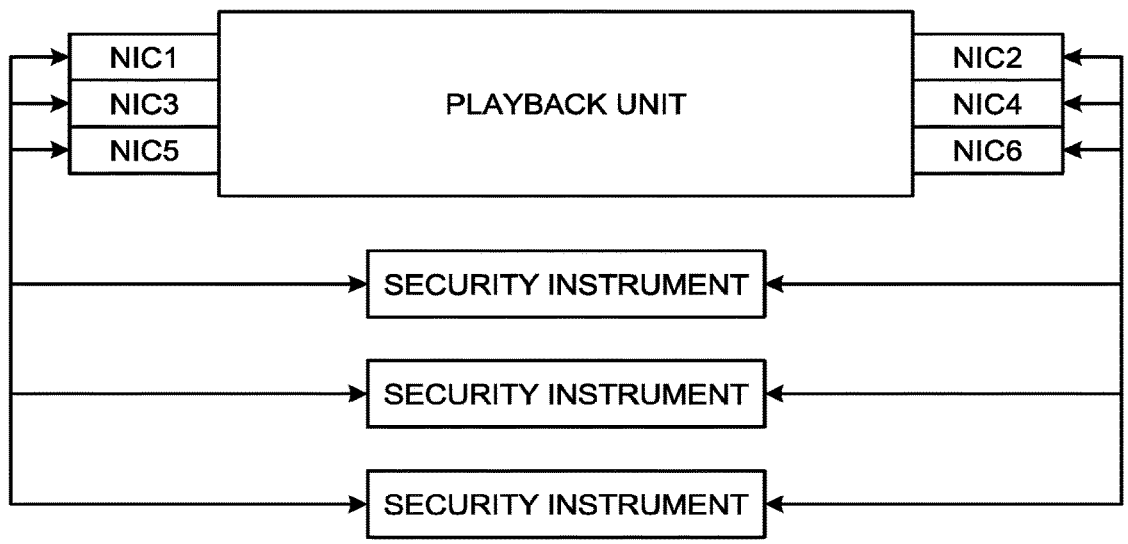
FIG. 6 is a diagram illustrating an example of a connection method for a playback device and security instruments.

The playback unit 122 is connected to the security instrument 20 by, for example, a connection method as illustrated in FIG. 5 or 6. FIGS. 5 and 6 are diagrams illustrating examples of the connection method for the playback device and the security instruments.

As illustrated in FIG. 5, the playback unit 122 may be connected to the security instruments 20 by way of two NICs and a switch or a tap. In this case, for example, an NIC1 is used as the transmitting side and an NIC2 is used as the receiving side. Alternatively, as illustrated in FIG. 6, the playback unit 122 may be connected to each security instrument 20 so as to sandwich the security instrument 20 in-line using two NICs. The playback unit 122 therefore uses two NICs for one flow of traffic. In addition, the NIC, switch, tap, and the like may be physical devices or virtual devices.

Figure 7:
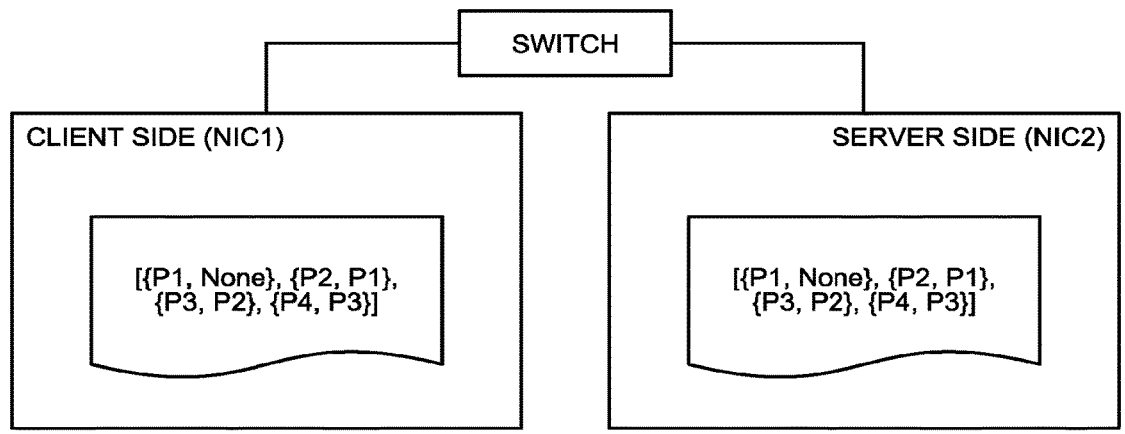
FIG. 7 is a diagram for explaining a playback method for playback traffic.
Figure 8:
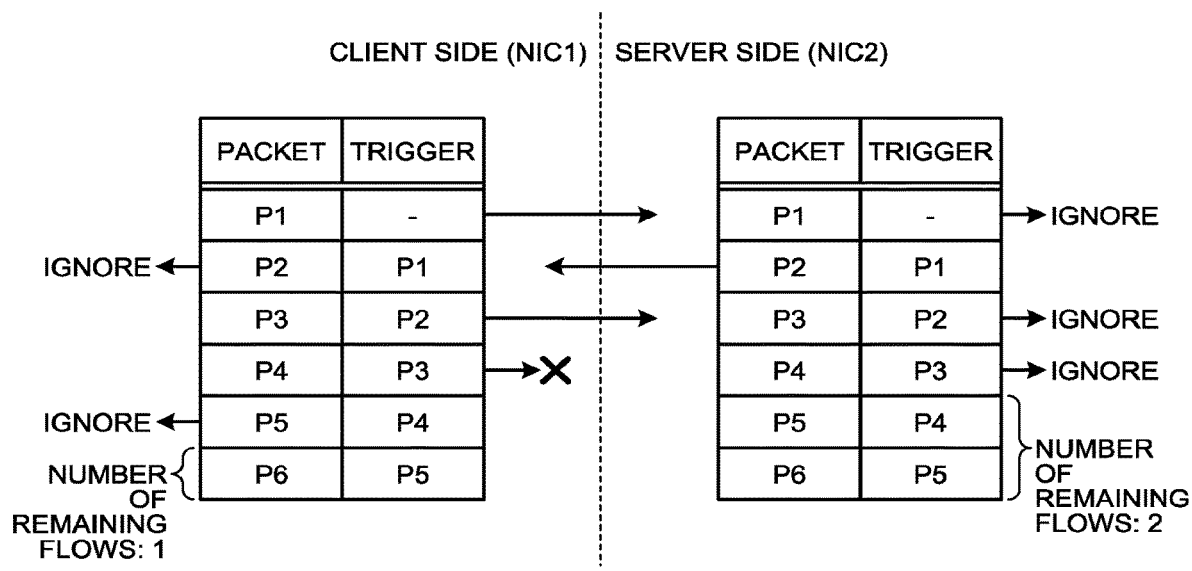
FIG. 8 is a diagram for explaining a playback method for playback traffic.

A playback method for the playback traffic will be described with reference to FIGS. 7 and 8. FIGS. 7 and 8 are diagrams for explaining a playback method for the playback traffic. The playback unit 122 transmits traffic whose source is a client side terminal from one NIC and transmits traffic whose source is a server side terminal from the other NIC. Here, as an example, it is assumed that the playback unit 122 transmits the traffic whose source is the client side terminal from an NIC1 and transmits the traffic whose source is the server side terminal from an NIC2. At this time, as illustrated in FIG. 7, the playback unit 122 refers to data of the playback traffic from both of the client side and the server side.

For example, among pieces of data of the playback traffic illustrated in FIG. 7, {P1, None} indicates traffic of which the packet identifier is "P1" and the trigger packet identifier is "None". In addition, for example, {22, P1} indicates traffic of which the packet identifier is "P2" and the trigger packet identifier is "P1".

Note that it is assumed that each playback traffic in FIG. 7 corresponds to the playback traffic in FIG. 4. In addition, it is assumed that the IP address "192.168.1.1" in FIG. 4 is the IP address of the client side terminal and the IP addresses "192.0.2.8" and "198.51.100.70" are the IP addresses of the server side terminal. Furthermore, in the following description, the playback traffic with the packet identifier "P1" is sometimes referred to as playback traffic "P1".

As illustrated in FIG. 8, the playback unit 122 first refers to the playback traffic "P1". At this time, the source IP address of the playback traffic "P1" is "192.168.1.1", that is, the IP address of the client side terminal. Therefore, the playback unit 122 transmits the playback traffic "P1" from the NIC1. On the other hand, the playback unit 122 ignores the playback traffic "P1" on the server side.

Next, since the playback traffic "P1" has been transmitted, the playback unit 122 refers to the playback traffic "P2" whose trigger is the playback traffic "P1". At this time, the source IP address of the playback traffic "P2" is "192.0.2.8", that is, the IP address of the server side terminal. Therefore, the playback unit 122 transmits the playback traffic "P2" from the NIC2. On the other hand, the playback unit 122 ignores the playback traffic "P2" on the client side.

Next, since the playback traffic "P2" has been transmitted, the playback unit 122 refers to the playback traffic "P3" whose trigger is the playback traffic "P2". At this time, the source IP address of the playback traffic "P3" is "192.168.1.1", that is, the IP address of the client side terminal. Therefore, the playback unit 122 transmits the playback traffic "P3" from the NIC1. On the other hand, the playback unit 122 ignores the playback traffic "P3" on the server side.

Next, since the playback traffic "P3" has been transmitted, the playback unit 122 refers to the playback traffic "P4" whose trigger is the playback traffic "P3". At this time, the source IP address of the playback traffic "P4" is "192.168.1.1", that is, the IP address of the client side terminal. Therefore, the playback unit 122 transmits the playback traffic "P4" from the NIC1. On the other hand, the playback unit 122 ignores the playback traffic "P4" on the server side.

In addition, when sensing that the generated traffic has stopped, the playback unit 122 specifies traffic to be generated on the basis of the traffic that has been already generated and a trigger set for traffic that has not yet been generated, and generates the specified traffic.

Here, a case where a packet transmitted from the NIC1 has stopped, that is, a case where the packet has been dropped will be described. As illustrated in FIG. 8, since the source IP address of the playback traffic "P5" is the IP address of the server side terminal, the playback unit 122 ignores the playback traffic "P5" on the client side. On the other hand, the playback unit 122 stands by for reception of the playback traffic "P4" which is a trigger for transmitting the playback traffic "P5".

Here, when a predetermined time set for the timeout has elapsed, the playback unit 122 refers to the number of remaining flows of playback traffic on the client side and the server side and transmits the playback traffic on a side with the larger number of remaining flows. In this case, since the number of remaining flows on the server side is two and is larger than the number of remaining flows on the client side, namely, one, the playback unit 122 transmits the playback traffic "P5" from the NIC2.

Here, an event by the security instrument 20 will be described with reference to FIG. 9. FIG. 9 is a diagram illustrating an example of items of an event by a security instrument. As illustrated in FIG. 9, items of the event by the security instrument 20 include "sensing time", "security instrument name", "category of threat (category ID)", "degree of urgency", "sensed event name (event ID), "source IP address", "destination IP address", "source port number", "destination port number", "application", "action", and the like. When collecting an event from the security instrument 20, the determination device 30 may appropriately parse and organize an event that is not in a fixed format as illustrated in FIG. 9.

Events by the security instrument 20 will be described with reference to FIGS. 10 and 11. FIG. 10 is a diagram illustrating an example of events by the security instrument for the malicious traffic. FIG. 11 is a diagram illustrating an example of events by the security instrument for the benign traffic.

Upon receipt of a packet, the security instrument 20 performs processes such as sensing and defense against illegal communication using the instrument's own sensing and defense logic and at the same time produces an event. The security instrument 20 may be a dedicated device specialized in security, or a network device having a filter function, or the like. The security instrument 20 is, for example, a firewall, a next generation firewall, an IDS, an intrusion prevention system (IPS), a unified threat management (UTM), a sandbox, and a router and a switch having a packet filter function.

As illustrated in FIG. 10, items of the malicious event, that is, the event by the security instrument 20 for the malicious traffic include "sensing time", "security instrument name", "category", "degree of urgency", "event name", "source/destination IP address/malware identifier", "source port number", "destination port number", "application", "action", and the like. Note that the items of the malicious events illustrated in FIG. 10 are an example.

For example, the fifth line of FIG. 10 indicates an event of which the sensing time is "03/11 01:00:01", the security instrument name is "Company A product", the category is "unknown site", the degree of urgency is "Info", the event name is "http://unknown.com/", the malware identifier is "M1", the destination IP address is "10.0.0.4", the source port number is "1027", the destination port number is "80", the application is "Web-browsing", and the action is "alert".

In addition, the determination device 30 may extract a feature from related malicious events. For example, the events indicated by the thick frame in FIG. 10 are events with close sensing times and the same destination IP address grouped as related events.

As illustrated in FIG. 11, items of the benign event, that is, the event by the security instrument 20 for the benign traffic include "sensing time", "security instrument name", "category", "degree of urgency", "event name", "source/destination IP address", "source port number", "destination port number", "application", "action", and the like. Note that the items of the benign events illustrated in FIG. 11 are an example.

For example, the fourth line of FIG. 11 indicates an event of which the sensing time is "03/11 01:00:01", the security instrument name is "Company A product", the category is "vulnerability", the degree of urgency is "Info", the event name is "HTTP OPTIONS Method", the source IP address is "192.168.1.1", the destination IP address is "10.0.0.4", the source port number is "1027", the destination port number is "80", the application is "Web-browsing", and the action is "alert".

In addition, the determination device 30 may extract a feature from related benign events. For example, the events indicated by the thick frame in FIG. 11 are events with close sensing times and the same destination IP address grouped as related events. Furthermore, items of the real network event, that is, the event by the security instrument 20 for the real network traffic is, for example, similar to the items of the benign event.

Here, the configuration of the determination device 30 will be described with reference to FIG. 12. FIG. 12 is a diagram illustrating an example of the configuration of the determination device according to the first embodiment. As illustrated in FIG. 12, the determination device 30 has an input/output unit 31, a control unit 32, and a storage unit 33. The input/output unit 31, the control unit 32, and the storage unit 33 are realized by devices similar to the input/output unit 11, the control unit 12, and the storage unit 13 of the playback device 10, respectively.

The control unit 32 has a collection unit 321, an extraction unit 322, and a determination unit 323. The collection unit 321 collects an event generated by the security instrument 20 for the generated traffic. In addition, the extraction unit 322 extracts a feature from the event collected by the collection unit 321. Furthermore, on the basis of the feature extracted by the extraction unit 322, the determination unit 323 determines whether the event to be determined is for the malicious traffic or benign traffic. Note that the event to be determined is a real network event.

Features of the malicious event extracted by the extraction unit 322 will be described with reference to FIG. 13. FIG. 13 is a diagram illustrating an example of features extracted from the malicious events. The extraction unit 322 extracts features as illustrated in FIG. 13 from the malicious events as illustrated in FIG. 10. For example, the extraction unit 322 computes the number of pieces of generated malware/number of terminals for any field of the malicious events for each security instrument 20 and extracts the result of computation as a generation rate.

In the example in FIG. 13, the extraction unit 322 assigns the security instrument name and the event name as features and extracts the number of pieces of generated malware and the generation rate of each feature. For example, the first line of FIG. 13 indicates that a malicious event of which the security instrument name is "Company A product" and the event name is "event Ea1" has "80" for the number of pieces of generated malware and "0.8" for the generation rate.

The extraction unit 322 calculates a score representing the level of maliciousness or the level of benignity of the event to be determined, on the basis of the frequency at which the event to be determined was generated as a malicious event and the frequency at which the event to be determined was generated as a benign event. Alternatively, the extraction unit 322 may calculate a score representing the level of maliciousness or the level of benignity of the event to be determined, on the basis of the frequency at which the event to be determined and an event whose degree of similarity to the event to be determined is equal to or greater than a predetermined value were generated as malicious events and the frequency at which the event to be determined and an event whose degree of similarity to the event to be determined is equal to or greater than a predetermined value were generated as benign events.

The malicious score representing the degree of maliciousness of each feature calculated by the extraction unit 322 will be described with reference to FIG. 14. FIG. 14 is a diagram illustrating an example of the malicious scores. As illustrated in FIG. 14, the malicious score may be a generation ratio obtained by dividing a generation rate of a certain feature in the malicious events by the generation rate of the certain feature in the benign events. Alternatively, the malicious score may be a X-square value of the generation rate of a certain feature in the malicious events.

When the related event is used as the malicious event, the extraction unit 322 adds a weight to the malicious score in accordance with the characteristics of the security instrument 20 included in the related event. For example, the extraction unit 322 may multiply the malicious score by 1.5 when the events included in the related events are only the events by the same security instrument 20 and may multiply the malicious score by 2.0 when the event of a different security instrument 20 is included in the related events.

For example, the extraction unit 322 computes the malicious score of each feature as follows. At this time, an event Ea3 by the Company A product and an event Ea4 by the Company A product are related events having the events by the same security instrument 20. In addition, an event Ea5 by the Company A product and an event Eb5 by a Company B product are related events having events by different security instruments 20. Furthermore, in this case, the extraction unit 322 is assumed to employ the ratio of the generation rates as a malicious score.

Malicious score of "Company B product_event Eb1"

0.8/0.01=80

Malicious score of "Company A product_event Ea3" and "Company A product_event Ea4"

0.6/0.01*1.5=90

Malicious score of "Company A product_event Ea5" and "Company B product_event Eb5"

0.6/0.01*2.0=120

Additionally, as illustrated in FIG. 15, the extraction unit 322 creates a malicious event signature on the basis of the malicious score. FIG. 15 is a diagram illustrating an example of malicious event signatures. In this case, the extraction unit 322 extracts a feature whose malicious score is equal to or greater than five as a malicious event signature.

Based on the score, the determination unit 323 determines whether the event to be determined is for the malicious traffic or benign traffic. For example, the determination unit 323 refers to the malicious event signatures in FIG. 15 and determines that traffic with the malicious score of the event Eb1 by the Company B product equal to or greater than 80 is malicious. Furthermore, the extraction unit 322 may produce a malicious event identifier by applying various machine learning algorithms with "malicious event" as a positive example and "benign event" as a negative example. In this case, the determination unit 323 can make a determination by the malicious event identifier.

Process of First Embodiment

Figure 16:
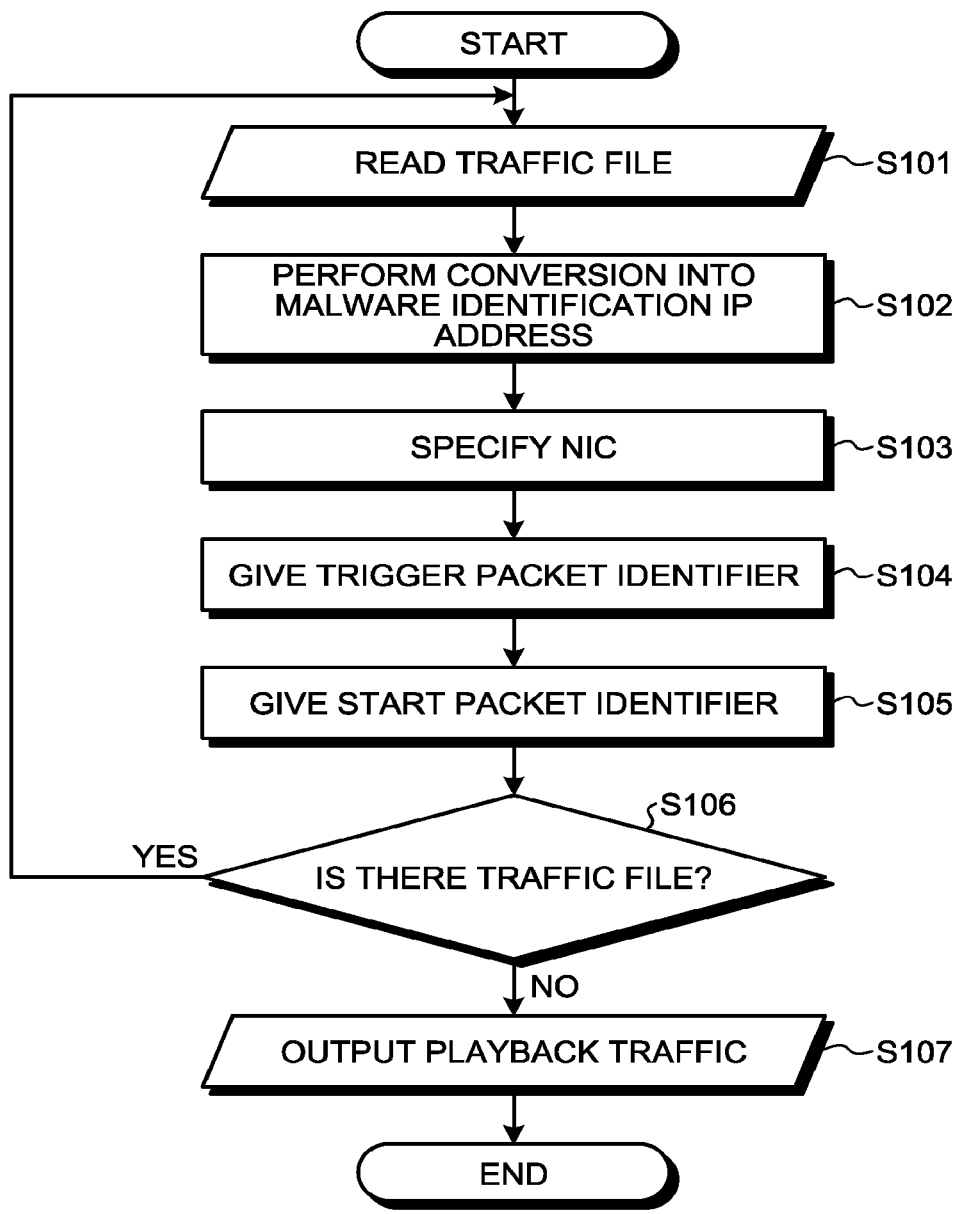
FIG. 16 is a flowchart illustrating the flow of process of a reading unit of the playback device according to the first embodiment.

Here, a process of the reading unit 121 of the playback device 10 will be described with reference to FIG. 16. FIG. 16 is a flowchart illustrating the flow of a process of the reading unit of the playback device according to the first embodiment. As illustrated in FIG. 16, the reading unit 121 first reads the malicious traffic file and the benign traffic file (step S101). Next, when a malware identifier is included in each traffic file, the reading unit 121 converts the included malware identifier into a malware identification IP address (step S102).

Next, the NIC to be assigned as a source is specified depending on whether the source of each packet included in each traffic file is the client side or the server side (step S103). Then, the reading unit 121 gives the trigger packet identifier and the start packet identifier to each packet (steps S104 and S105).

When there is no traffic file here (step S106, No), the reading unit 121 outputs the playback traffic that has been created (step S107). Meanwhile, when there is a traffic file (step S106, Yes), the reading unit 121 returns the process to step S101.

Figure 17:
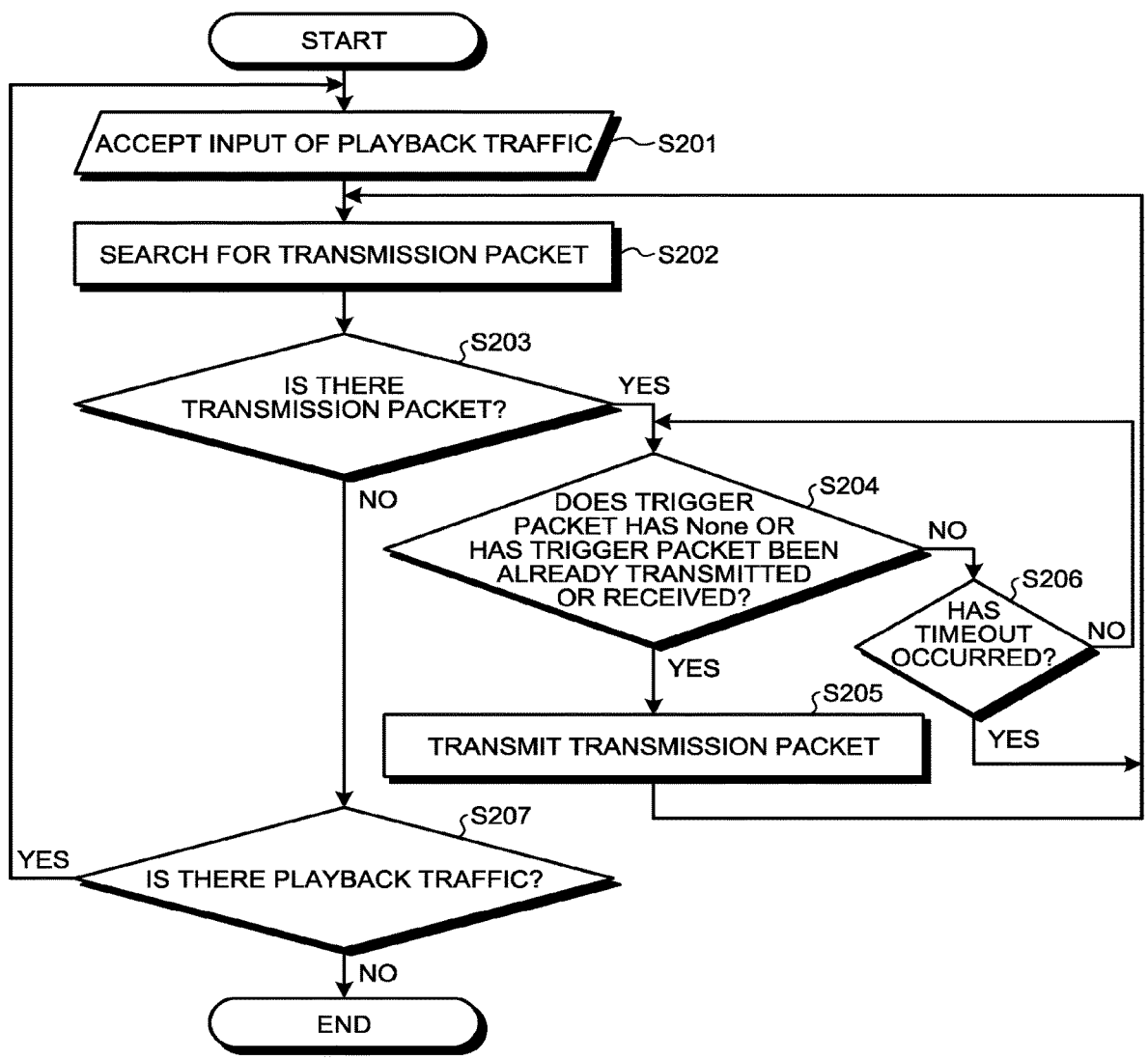
FIG. 17 is a flowchart illustrating the flow of a process of a playback unit of the playback device according to the first embodiment.

Next, a process of the playback unit 122 will be described with reference to FIG. 17. FIG. 17 is a flowchart illustrating the flow of a process of the playback unit of the playback device according to the first embodiment. As illustrated in FIG. 17, the playback unit 122 first accepts an input of playback traffic (step S201). Then, the playback unit 122 searches the playback traffic for a transmission packet to be transmitted from the NIC on either the client side or the server side and not blocked (step S202).

Note that the blocked transmission packet is a transmission packet blocked at a traffic block event to be described later and a transmission packet set with the same start packet identifier as the start packet identifier of such a transmission packet. For example, in the example in FIG. 4, when a packet whose packet identifier is "P1" is blocked, a packet whose packet identifier is "P1" and a packet whose packet identifier is "P2" are both regarded as blocked transmission packets. This is because the packet whose packet identifier is "P2" has the same start packet identifier as that of the packet whose packet identifier is "P1".

In addition, as described earlier, when the trigger packet is not received for a predetermined time and timeout occurs, a packet having the same start packet identifier as that of the relevant packet that could not receive the trigger packet is similarly not retrieved as a transmission packet.

In a case where the transmission packet has been retrieved (step S203, Yes), the playback unit 122 transmits the retrieved transmission packet (step S205) when the trigger packet of the retrieved transmission packet has None or when the trigger packet of the retrieved transmission packet has been already transmitted or received (step S204, Yes). In addition, when the trigger packet of the retrieved transmission packet has not yet been transmitted or received (step S204, No), the playback unit 122 determines whether timeout has occurred (step S206). When timeout has not occurred (step S206, No), the playback unit 122 returns the process to step S204. On the other hand, when timeout has occurred (step S206, Yes), the playback unit 122 does not transmit the retrieved transmission packet but searches for another transmission packet (step S202).

Meanwhile, when the transmission packet has not been retrieved (step S203, No), the playback unit 122 further accepts an input of playback traffic (step S201) if there is playback traffic that has not yet been input (step S207, Yes). On the other hand, when there is no playback traffic that has not yet been input (step S207, No), the playback unit 122 terminates the process.

Figure 18:
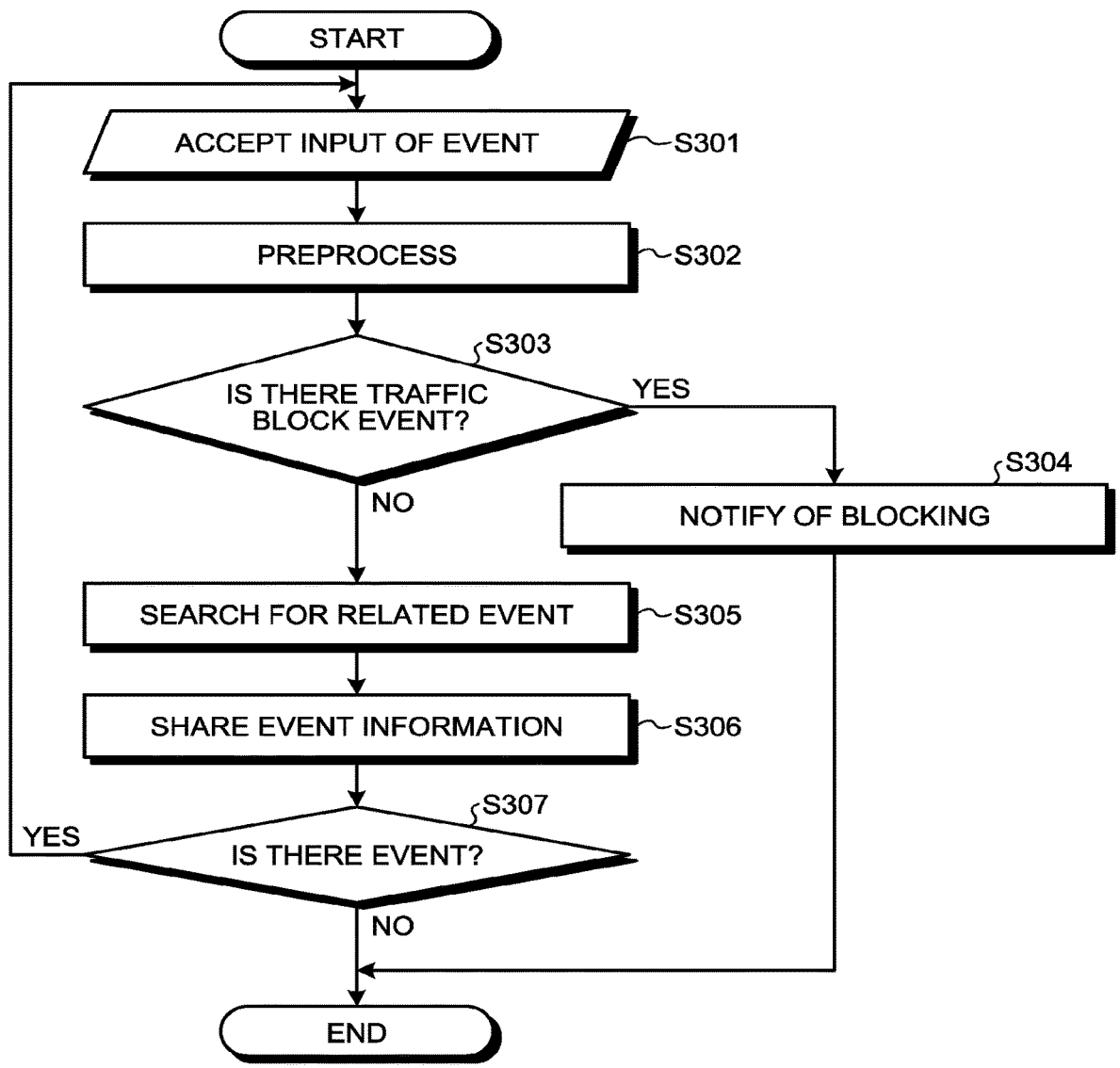
FIG. 18 is a flowchart illustrating the flow of a process of a collection unit of the determination device according to the first embodiment.

Next, a process of the collection unit 321 will be described with reference to FIG. 18. FIG. 18 is a flowchart illustrating the flow of a process of the collection unit of the determination device according to the first embodiment. As illustrated in FIG. 18, the collection unit 321 first accepts an input of an event output from the security instrument 20 (step S301). Next, the collection unit 321 performs preprocesses such as parsing and organizing of the event (step S302).

Here, when there is a traffic block event that is an event of sensing that the traffic has been blocked (step S303, Yes), the collection unit 321 specifies the blocked packet on the basis of the IP address, the port number, and the like included in the event and notifies the playback unit 122 of the fact that the traffic has been blocked and information associated with the specified packet (step S304).

When there is no traffic block event (step S303, No), the collection unit 321 searches for a related event (step S305). Then, the collection unit 321 shares information associated with the related event with the extraction unit 322 (step S306). Thereafter, when there is an event that has not yet been input (step S307, Yes), the collection unit 321 further accepts an input of an event (step S301). On the other hand, when there is no event that has not yet been input (step S307, No), the collection unit 321 terminates the process.

Figure 19:
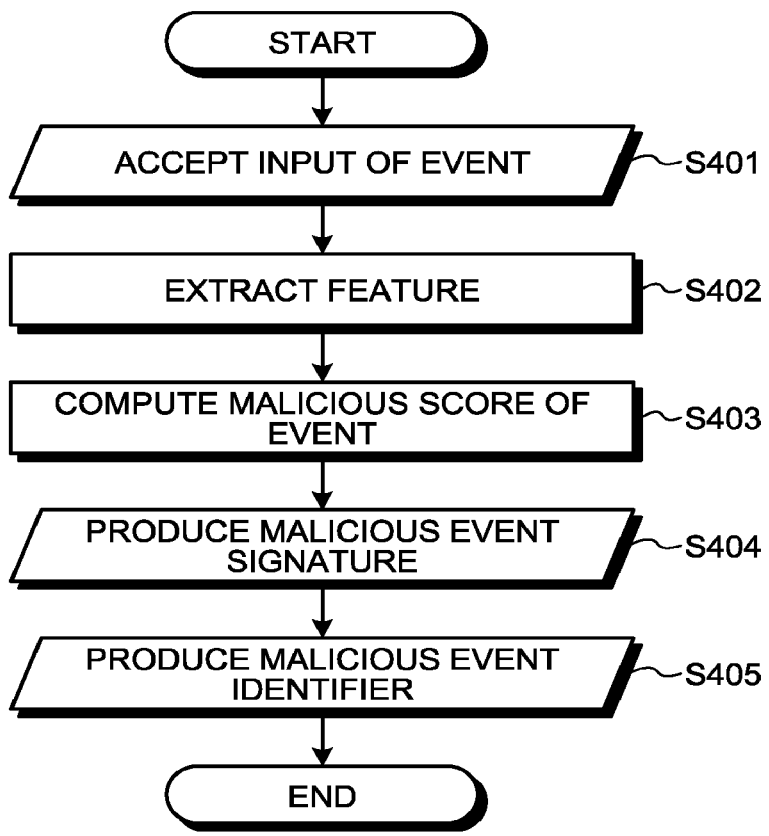
FIG. 19 is a flowchart illustrating the flow of a process of an extraction unit of the determination device according to the first embodiment.

Next, a process of the extraction unit 322 will be described with reference to FIG. 19. FIG. 19 is a flowchart illustrating the flow of a process of the extraction unit of the determination device according to the first embodiment. As illustrated in FIG. 19, the extraction unit 322 first accepts an input of an event collected by the collection unit 321 (step S401). Next, the extraction unit 322 extracts a feature from the event (step S402). Then, the extraction unit 322 computes the malicious score of each event (step S403) and produces a malicious event signature and a malicious event identifier (steps S404 and S405).

Figure 20:
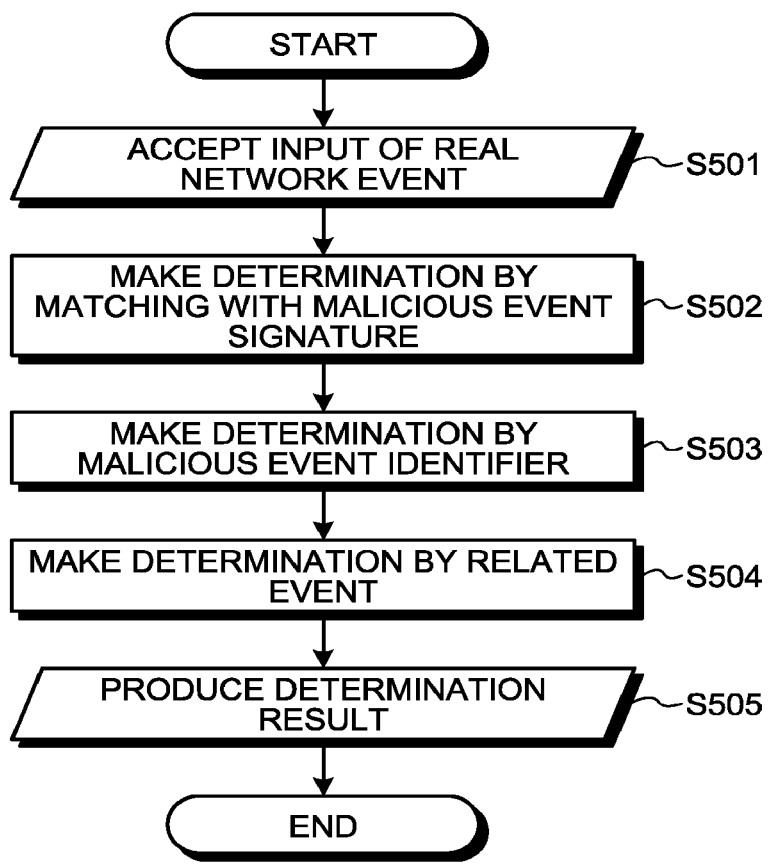
FIG. 20 is a flowchart illustrating the flow of a process of a determination unit of the determination device according to the first embodiment.

Next, a process of the determination unit 323 will be described with reference to FIG. 20. FIG. 20 is a flowchart illustrating the flow of a process of the determination unit of the determination device according to the first embodiment. As illustrated in FIG. 20, the determination unit 323 first accepts an input of a real network event (step S501). Next, the determination unit 323 makes a determination by matching with the malicious event signature (step S502), a determination by the malicious event identifier (step S503), and a determination by the related event (step S504). Then, the determination unit 323 produces a determination result (step S505).

Effect of First Embodiment

The reading unit 121 reads the traffic file which is a dump file of traffic when the malicious or benign traffic is generated. The playback unit 122 also generates traffic based on the traffic file on a network having the security instrument 20 that generates an event in accordance with the traffic. Meanwhile, the collection unit 321 collects an event generated by the security instrument 20 for the generated traffic. In addition, the extraction unit 322 extracts a feature from the event collected by the collection unit 321. Furthermore, on the basis of the feature extracted by the extraction unit 322, the determination unit 323 determines whether the event to be determined is for the malicious traffic or benign traffic.

With this process, even if a large number of different types of events are sensed by the security instruments and include events not correlated with communication by malware, determination on maliciousness or benignity is automatically made, such that efficient analysis is achieved.

The reading unit 121 may read a traffic file including information indicating the traffic generation order and may set each flow of the traffic based on the traffic file with traffic having an immediately preceding generation order, as a trigger. At this time, after the generation of the traffic set as a trigger by the reading unit 121 is completed, the playback unit 122 generates traffic for which the generated traffic is set as a trigger.

This makes it possible to reproduce the flows of traffic in an order in which the flows of traffic were actually generated. In addition, the generation of the next traffic is enabled as soon as the conditions associated with the trigger are satisfied, such that it is possible to generate traffic at intervals shorter than intervals at which the traffic was actually generated and make determination or the like in a shorter time.

In addition, when sensing that the generated traffic has stopped, the playback unit 122 specifies traffic to be generated on the basis of the traffic that has been already generated and a trigger set for traffic that has not yet been generated, and generates the specified traffic. With this process, even if traffic stops for some reason, it is possible to automatically recover and continue the process.

The reading unit 121 reads the malicious traffic file which is a dump file of traffic when the malicious traffic is generated and the benign traffic file which is a dump file of traffic when the benign traffic is generated. In addition, the playback unit 122 generates the malicious traffic which is traffic based on the malicious traffic file and the benign traffic which is traffic based on the benign traffic file. Meanwhile, the collection unit 321 collects the malicious event which is an event for the malicious traffic and the benign event which is an event for the benign traffic. Furthermore, the extraction unit 322 extracts a feature of the malicious event and a feature of the benign event. As described above, by performing feature extraction based on both of the malicious traffic file and the benign traffic file, it is possible to make a highly accurate determination.

The extraction unit 322 may calculate a score representing the level of maliciousness or the level of benignity of the event to be determined, on the basis of the frequency at which the event to be determined was generated as a malicious event and the frequency at which the event to be determined was generated as a benign event. In this case, the determination unit 323 determines, based on the score, whether the event to be determined is for the malicious traffic or the benign traffic.

With this process, it is possible to reflect both of the generation frequency of event as the malicious event and the generation frequency of event as the benign event in the score, such that the detection rate can be raised and the false detection rate can be lowered.

The extraction unit 322 may calculate a score representing the level of maliciousness or the level of benignity of the event to be determined, on the basis of the frequency at which the event to be determined and an event whose degree of similarity to the event to be determined is equal to or greater than a predetermined value were generated as malicious events and the frequency at which the event to be determined and an event whose degree of similarity to the event to be determined is equal to or greater than a predetermined value were generated as benign events. In this case, the determination unit 323 may determine, based on the score, whether the event to be determined is for the malicious traffic or the benign traffic.

When a plurality of malicious events has a relationship of related events, it is conceivable that there are cases where this plurality of malicious events has a higher level of maliciousness than that of a malicious event that does not have a related event. Accordingly, it is possible to further improve the detection accuracy by calculating the score in consideration of related events.

Other Embodiments

Figure 21:
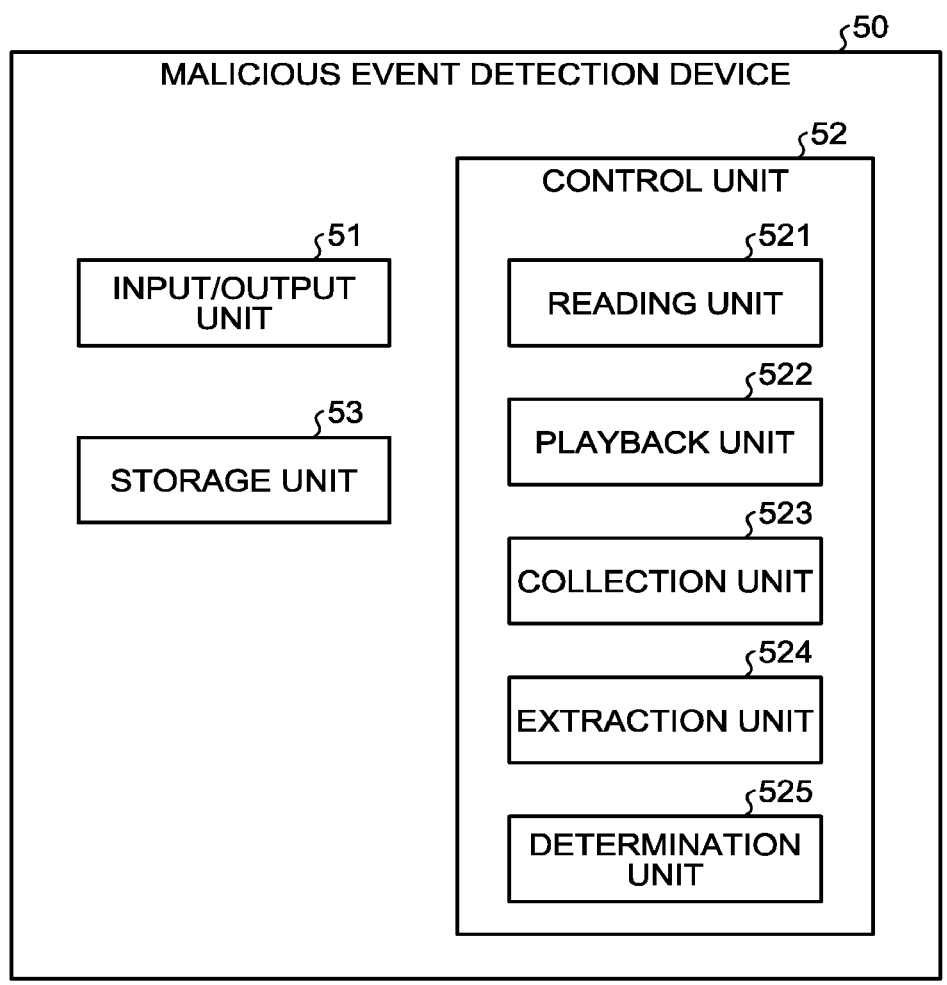
FIG. 21 is a diagram illustrating an example of the configuration of a malicious event detection device.

The respective processing units of the playback device 10 and the determination device 30 of the malicious event detection system 1 may be realized by one device as illustrated in FIG. 21. FIG. 21 is a diagram illustrating an example of the configuration of a malicious event detection device. As illustrated in FIG. 21, a malicious event detection device 50 has an input/output unit 51, a control unit 52, and a storage unit 53. The input/output unit 51, the control unit 52, and the storage unit 53 are realized by devices similar to the input/output unit 11, the control unit 12, and the storage unit 13 of the playback device 10, respectively. In addition, the control unit 52 has a reading unit 521, a playback unit 522, a collection unit 523, an extraction unit 524, and a determination unit 525. The reading unit 521, the playback unit 522, the collection unit 523, the extraction unit 524, and the determination unit 525 perform processes similar to those of the reading unit 121, the playback unit 122, the collection unit 321, the extraction unit 322, and the determination unit 323, respectively.

System Configuration and Others

Each of the illustrated constituent members of the respective devices serves as a sort of a function concept and thus is not necessarily required to be physically configured as illustrated. That is, specific modes of separation and integration of the respective devices are not limited to the illustrated ones and accordingly, all or some thereof can be configured so as to be functionally and physically separated or integrated in any units depending on various types of loads, usage, and the like. Furthermore, all or any part of processing functions individually performed in the respective devices can be realized by a CPU and a program analyzed and executed by this CPU, or can be realized as hardware by wired logic.

Among the variety of processes described in the embodiments, all or some of the processes described as being automatically performed can be performed manually, or reversely, all or some of the processes described as being manually performed can be performed automatically using a publicly available method. In addition to this, information indicated within this document and the drawings described above, including processing procedures, control procedures, specific names, and various types of data and parameters, can be arbitrarily altered unless otherwise specially stated.

Program

In one embodiment, the malicious event detection device 50 can be implemented by installing a malicious event detection program that executes the malicious event detection described above in a desired computer as package software or online software. For example, by causing an information processing device to execute the above-mentioned malicious event detection program, the information processing device can function as the malicious event detection device 50. The information processing device mentioned here includes a desktop type or note type personal computer. Moreover, a mobile communication terminal such as a smartphone, a cellular phone, and a personal handyphone system (PHS), as well as a slate terminal such as a personal digital assistant (PDA), and the like also fall within the scope of the information processing device.

The malicious event detection device 50 may also be implemented as a malicious event detection server device that employs a terminal device used by a user as a client and provides this client with a service associated with the malicious event detection described above. For example, the malicious event detection server device is implemented as a server device that provides a malicious event detection service in which the real network traffic file is input and a determination result is output. In this case, the malicious event detection server device may be implemented as a Web server, or may be implemented as a cloud that provides a service associated with the malicious event detection described above by outsourcing.

Figure 22:
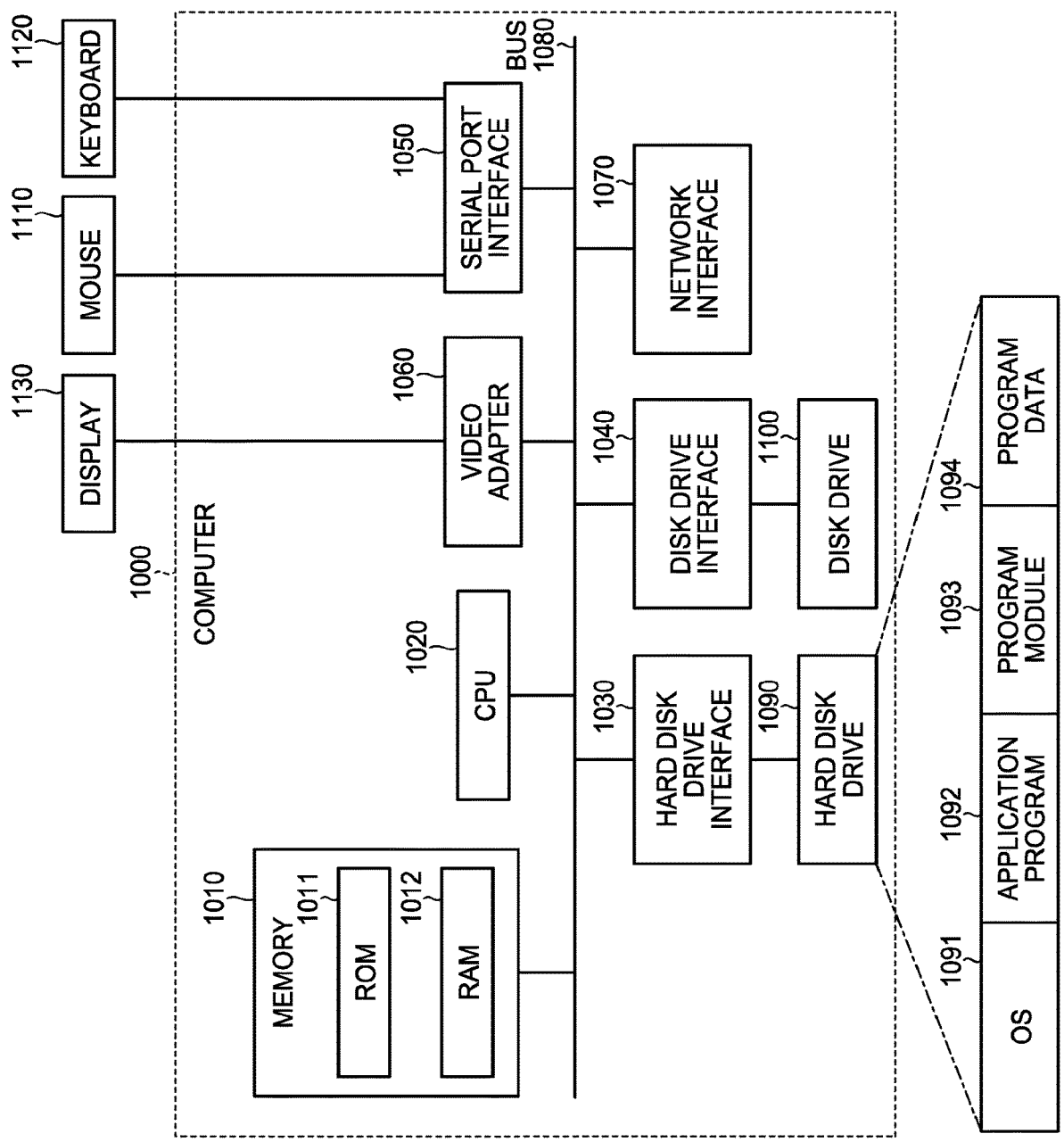
FIG. 22 is a diagram illustrating an example of a computer in which the malicious event detection device is realized by executing a program.

FIG. 22 is a diagram illustrating an example of a computer in which the malicious event detection device is realized by executing a program. A computer 1000 has, for example, a memory 1010 and a CPU 1020. The computer 1000 also has, for example, a hard disk drive interface 1030, a disk drive interface 1040, a serial port interface 1050, a video adapter 1060, and a network interface 1070. These respective components are connected through a bus 1080.

The memory 1010 includes a read only memory (ROM) 1011 and a RAM 1012. The ROM 1011 stores a boot program such as a basic input output system (BIOS). The hard disk drive interface 1030 is connected to a hard disk drive 1090. The disk drive interface 1040 is connected to a disk drive 1100. A detachable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. That is, the program that defines each process of the malicious event detection device 50 is implemented as the program module 1093 in which a code executable by a computer is described. The program module 1093 is stored in, for example, the hard disk drive 1090. For example, the program module 1093 for executing a process similar to the functional configuration of the malicious event detection device 50 is stored in the hard disk drive 1090. Note that the hard disk drive 1090 may be replaced by an SSD.

In addition, setting data used in the processes of the above-described embodiments is stored, for example, in the memory 1010 or the hard disk drive 1090 as the program data 1094. Then, the CPU 1020 reads the program module 1093 and the program data 1094 stored in the memory 1010 and the hard disk drive 1090 to the RAM 1012 as necessary to execute.

Note that the program module 1093 and the program data 1094 are not limited to a case where the program module 1093 and the program data 1094 are stored in the hard disk drive 1090 and, for example, may be stored in a detachable storage medium so as to be read by the CPU 1020 via the disk drive 1100 and the like. Alternatively, the program module 1093 and the program data 1094 may be stored in another computer connected via a network (a LAN, a wide area network (WAN), or the like). Then, the program module 1093 and the program data 1094 may be read from the another computer by the CPU 1020 via the network interface 1070.

REFERENCE SIGNS LIST

1 MALICIOUS EVENT DETECTION SYSTEM
10 PLAYBACK DEVICE
11, 31, 51 INPUT/OUTPUT UNIT
12, 32, 52 CONTROL UNIT
13, 33, 53 STORAGE UNIT
20 SECURITY INSTRUMENT
30 DETERMINATION DEVICE
50 MALICIOUS EVENT DETECTION DEVICE
121, 521 READING UNIT
122, 522 PLAYBACK UNIT
321, 523 COLLECTION UNIT
322, 524 EXTRACTION UNIT
323, 525 DETERMINATION UNIT

The invention claimed is:

1. A malicious event detection system comprising: processing circuitry configured to:
read a traffic file which is a dump file of traffic when malicious or benign traffic is generated;
generate traffic based on the traffic file on a network having a security instrument that generates an event in accordance with the traffic by transmitting the traffic between at least two network interfaces of a same playback device;
collect an event generated by the security instrument for the generated traffic;
extract a feature from the event collected by the collecting; and determine whether the event to be determined is for malicious traffic or benign traffic, on the basis of the feature extracted by the extracting,
wherein the traffic file includes information indicating a traffic generation order, and the processing circuitry is further configured to:
set a trigger,
set each flow of traffic to be transmitted from one of the at least two network interfaces to another of the at least two network interfaces based on the traffic file with a transmission of a traffic flow having an immediately preceding generation order, as the trigger to cause transmission of another traffic flow in the traffic file, and
after generation of the traffic flow set as the trigger is completed, generate the another traffic flow in the traffic file for which the generated traffic is set as the trigger.

2. The malicious event detection system according to claim 1, wherein:
when sensing that the generated traffic has stopped, the processing circuitry generates specifies a traffic flow to be generated on the basis of traffic that has been already generated and a trigger set for a traffic flow that has not yet been generated, and generates the specified traffic flow.

3. The malicious event detection system according to claim 1, wherein:
the processing circuitry is further configured to:
read a malicious traffic file which is a dump file of traffic when malicious traffic is generated and a benign traffic file which is a dump file of traffic when benign traffic is generated,
generate malicious traffic which is traffic based on the malicious traffic file and benign traffic which is traffic based on the benign traffic file,
collect a malicious event which is an event for the malicious traffic and a benign event which is an event for the benign traffic, and
extract a feature of the malicious event and a feature of the benign event.

4. The malicious event detection system according to claim 3, wherein:
the processing circuitry is further configured to:
calculate a score representing a level of maliciousness or a level of benignity of the event to be determined, on the basis of a frequency at which the event to be determined was generated as the malicious event and a frequency at which the event to be determined was generated as the benign event, and
determine, based on the score, whether the event to be determined is for malicious traffic or benign traffic.

5. The malicious event detection system according to claim 3, wherein:
the processing circuitry is further configured to:
calculate a score representing a level of maliciousness or a level of benignity of the event to be determined, on the basis of a frequency at which the event to be determined and an event whose degree of similarity to the event to be determined is equal to or greater than a predetermined value were generated as the malicious events and a frequency at which the event to be determined and an event whose degree of similarity to the event to be determined is equal to or greater than a predetermined value were generated as the benign events, and
determine, based on the score, whether the event to be determined is for malicious traffic or benign traffic.

6. A malicious event detection method executed in a malicious event detection system, the malicious event detection method comprising:
reading a traffic file which is a dump file of traffic when malicious or benign traffic is generated;
generating traffic based on the traffic file on a network having a security instrument that generates an event in accordance with the traffic by transmitting the traffic between at least two network interfaces of a same playback device;
collecting an event generated by the security instrument for the generated traffic;
extracting a feature from the event collected by the collecting; and
determining whether the event to be determined is for malicious traffic or benign traffic, on the basis of the feature extracted by the extracting,
wherein the traffic file includes information indicating a traffic generation order, and
the method further includes:
setting a trigger, setting each flow of traffic to be transmitted from one of the at least two network interfaces to another of the at least two network interfaces based on the traffic file with a transmission of a traffic flow having an immediately preceding generation order, as the trigger to cause transmission of another traffic flow in the traffic file, and after generation of the traffic flow set as the trigger is completed, generating the another traffic flow in the traffic file for which the generated traffic is set as the trigger.

7. A non-transitory computer-readable recording medium having stored a program for malicious event detection that causes a computer to execute a processing comprising:

reading a traffic file which is a dump file of traffic when malicious or benign traffic is generated;

generating traffic based on the traffic file on a network having a security instrument that generates an event in accordance with the traffic by transmitting the traffic between at least two network interfaces of a same playback device;

collecting an event generated by the security instrument for the generated traffic;

extracting a feature from the event collected by the collecting; and determining whether the event to be determined is for malicious traffic or benign traffic, on the basis of the feature extracted by the extracting, wherein:

the processing further comprises setting a trigger, the reading reads a traffic file including information indicating a traffic generation order, the setting sets each flow of traffic to be transmitted from one of the at least two network interfaces to another of the at least two network interfaces based on the traffic file with a transmission of a traffic flow having an immediately preceding generation order, as a trigger to cause transmission of another traffic flow in the traffic file, and after generation of the traffic flow set as a trigger by the setting is completed, the generating generates the another traffic flow in the traffic file for which the generated traffic is set as a trigger.

\* \* \* \* \*